United States Patent [19]
Jones

[11] 3,749,932
[45] July 31, 1973

[54] LIGHT PEN
[76] Inventor: Norman F. Jones, Amherst, N.H.
[22] Filed: June 29, 1972
[21] Appl. No.: 267,626

[52] U.S. Cl............. 307/112, 178/DIG. 2, 250/227
[51] Int. Cl. .............................................. G02b 5/14
[58] Field of Search ...................... 250/227, 217 CR; 178/18, 19, 20, DIG. 2; 340/324 R; 307/112

[56] References Cited
UNITED STATES PATENTS

| | | | |
|---|---|---|---|
| 3,668,312 | 6/1972 | Yamamoto | 340/324 A X |
| 3,626,483 | 12/1971 | Whetstone | 178/18 X |
| 3,528,295 | 9/1970 | Johnson et al. | 178/18 X |
| 3,498,692 | 3/1970 | Jewitt et al. | 250/227 X |
| 3,247,391 | 4/1966 | Ogle | 250/216 |
| 3,199,078 | 8/1965 | Gaffney et al. | 178/18 X |
| 3,104,930 | 9/1963 | Schenzger | 178/20 X |

*Primary Examiner*—Herman J. Hohouser
*Assistant Examiner*—William J. Smith
*Attorney*—Pearson & Pearson

[57] ABSTRACT

An in-put tool for transmitting light pulses to an electronic unit from a light source includes a flexible, fiber-optic, light pipe connected to the unit and having a hollow, tubular light pen affixed around the free terminal end of the pipe. The light pen has a hollow, tubular nose-piece with a hollow, tubular, spring-pressed plunger therein, the plunger tip contacting the light source and passing light therethrough to the end face of the pipe and thence to the unit. Compression of the plunger causes a magnet to energize a reed switch and close a circuit to the unit.

6 Claims, 8 Drawing Figures

PATENTED JUL 31 1973

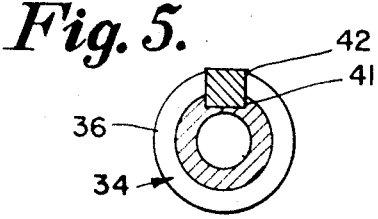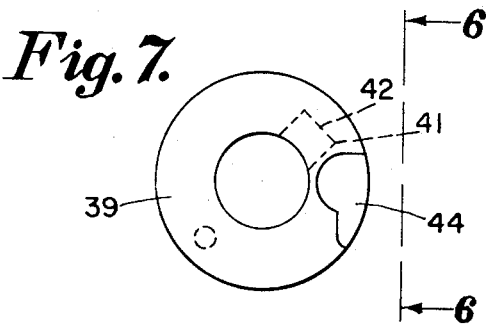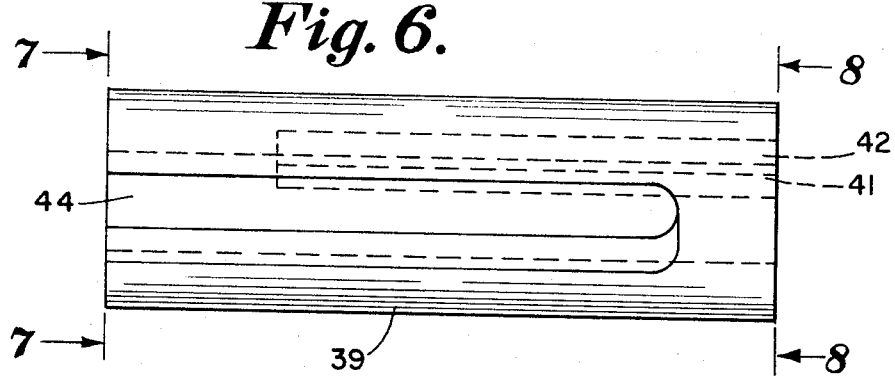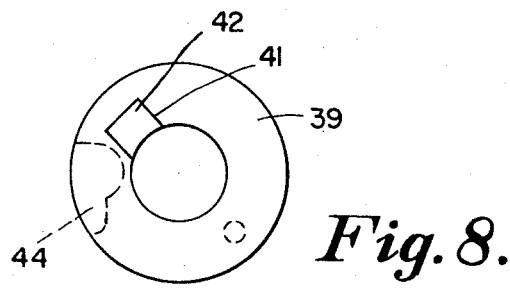

LIGHT PEN

BACKGROUND OF THE INVENTION

Switching means in the Pat. of a switch body with a slidable plunger, or spring-biased push button, the plunger carrying a permanent magnet which magnetically closes a reed switch, are old and well known. The plunger, or magnet carrier, of such switches, however, has been solid, or dead end; the plunger tips have been solid or capped and the plunger recess has invariably been dead end, usually to serve as a stop for a coil spring as disclosed in U.S. Pat. No. 3,271,708 to McCormick of Sept. 6, 1966, U.S. Pat. No. 3,418,611 to Pounds of Dec. 24, 1968, U.S. Pat. No. 3,465,271 to Koepke of Sept. 2, 1969, and U.S. Pat. No. 3,510,607 to Breed of May 5, 1970.

SUMMARY OF THE INVENTION

In this invention, the switching means is preferably also a magnet carrying plunger which is spring compressible alongside a reed switch. However, the plunger serves the additional function of transmitting light from the open ended, hollow tip thereof, through the axial bore to the polished end face of a fibre-optic light pipe, leading to an electronic unit responsive to such light pulses. Thus, the light pen of this invention is hollow-tubular and mounted to encircle the free terminal end of the light pipe, so that the hollow tip of the plunger may be lightly pressed against the face of a C.R.T. screen to serve as a highly sensitive and responsive input tool for C.R.T. display terminals that require a fast data positioning control capability.

It can be used for character sensing and editing operations with most high-speed C.R.T. displays. Depending on C.R.T. editing logic, it can be used to add, delete, correct copy and reposition character and vector data on the C.R.T. display screen. The pen tip activates the system, while providing a selective signal sensing characteristic to give the operator precise control of editing functions.

The hand-held pen is coupled by the small, light, flexible fiber-optic light pipe to a compact electronics unit, for example the "Dyno-Pak" Series 6000 of Norman-Jones Inc., South Merrimack, N.H., such a unit containing a regulated power supply, a signal conditioner and a photomultiplier, the photomultiplier signal being amplified and conditioned to an output level compatible with most standardized logic systems.

The light pen of the invention not only has a hollow, tubular tail piece for receiving the light tube, but also has a hollow, tubular nose piece for slidably receiving the hollow, tubular plunger, but the coil spring magnet and reed switch are all mounted outside the axial bore of the pen to permit light pulses to travel therealong.

BRIEF DESCRIPTION OF THE DRAWING

FIG. 5 is an end view of the plunger shown in FIG. 4 in section on line 5—5 of FIG. 4;

FIG. 6 is a form elevation of the hollow, tubular sleeve of the invention;

FIG. 7 is an end elevation on line 7—7 of FIG. 6 showing the reed switch groove; and FIG. 8 is an end elevation on line 8—8 of FIG. 6.

DESCRIPTION OF THE PREFERRED EMBODIMENT

Figure 1:
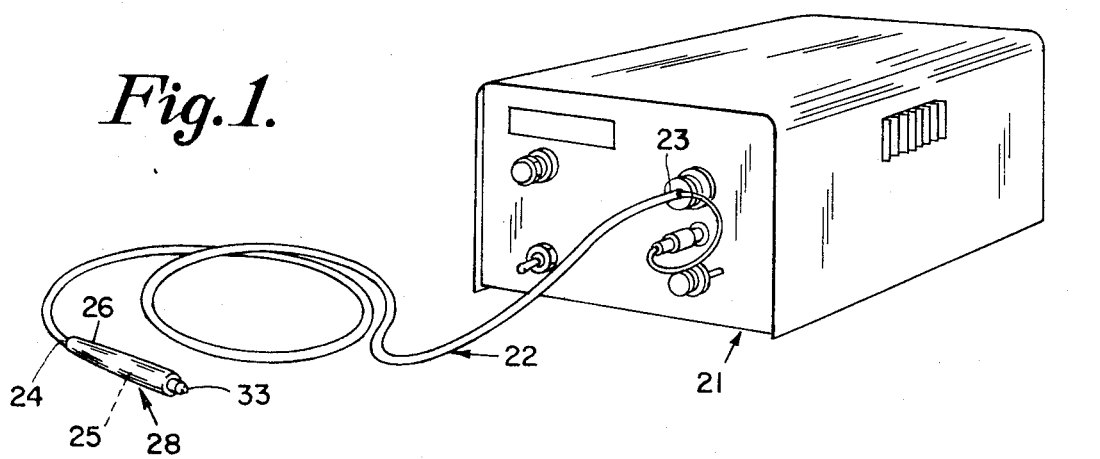
FIG. 1 is a perspective view of the light pen of the invention connected by a light pipe to an electronic unit.
Figure 2:
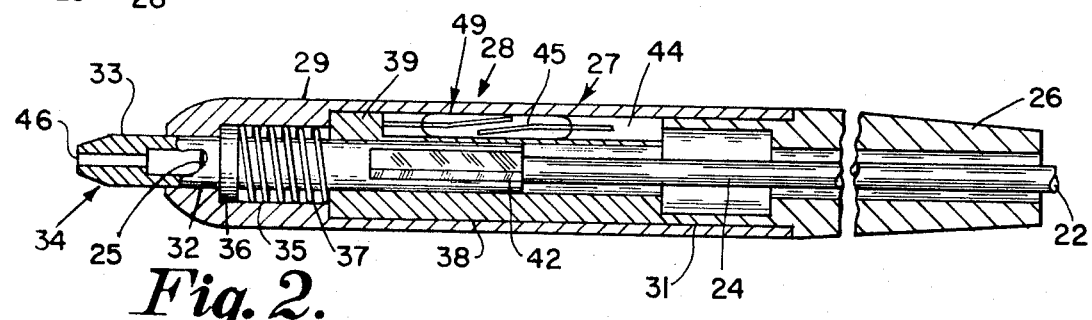
FIG. 2 is an enlarged side elevation in half-section of the light pen.
Figure 3:
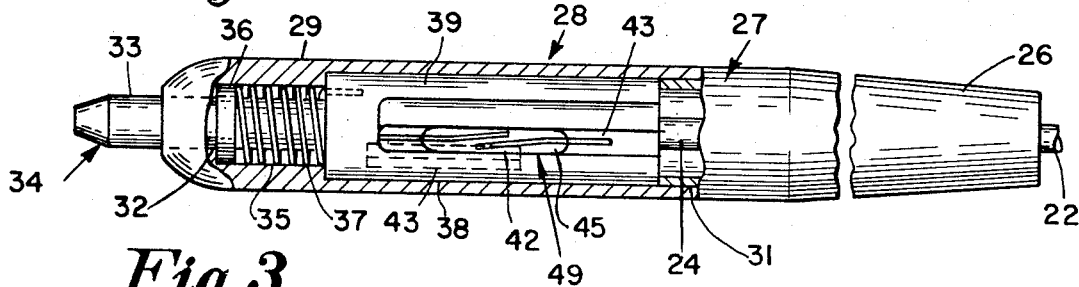
FIG. 3 is a plan view with parts broken away of the device shown in FIG. 2.
Figure 4:
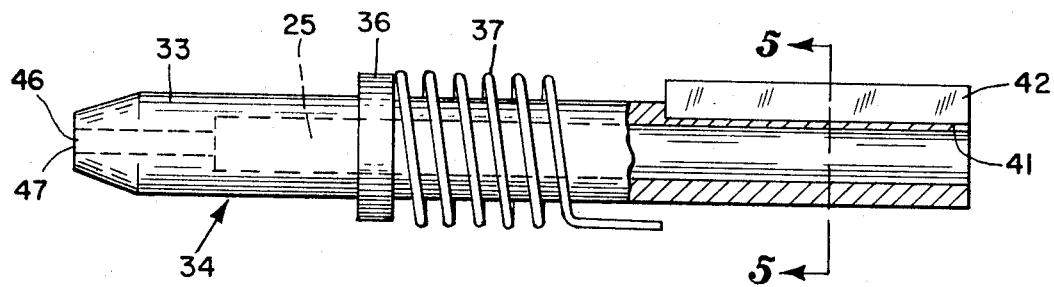
FIG. 4 is a still further enlarged side elevation of the hollow, tubular plunger of the invention, broken away to show the magnet and magnet groove.

As shown in FIG. 1, 21 is an electronic unit, such as the above mentioned "Dyno-Pak," the unit 21 including a regulated power supply, signal conditioner and photomultiplier and suitable amplification. A small, light, flexible fiber-optic light pipe 22 has one end 23 connected to the unit 21 and has a free terminal other end 24, the pipe being about 60 inches long. The unit 21 is sensitive to light pulses received through the light pipe and received by the polished end face 25 of the free end 24, the latter being within the hollow, tubular tail piece 26 of the body 27 of light pen 28.

The hollow, tubular body of pen 28 also includes a hollow, tubular nose piece 29 which is telescopably connected at 31 to the tail piece so that the two parts are slidably detachable. The nose piece 29 includes a forward axial bore 32 for slidably receiving the hollow, tubular tip 33 of the hollow, tubular plunger 34. It also includes a larger, intermediate axial bore 35 for receiving the integral, outwardly projecting, annular shoulder 36 of the plunger, or push rod, 34 and the return coil srping 37. Nose piece 29 also includes a still larger rearward axial bore 38 for receiving a hollow, tubular sleeve 39, removably seated therein.

The plunger 34 has an elongated magnet groove 41 in the rearward exterior face thereof, in which the elongated permanent magnet 42 is suitably affixed to extend axially and project outwardly therefrom The sleeve 39 includes a corresponding elongated magnet groove 43 in the inner face thereof, the groove 43 extending axially alongside an elongated groove 44 in which the reed switch 45 is seated.

It will be seen that when the tip 33 is pressed against a light source, such as a cathode ray tube of a computer terminal, the plunger 34 will be compressed rearwardly against the bias of spring 37 to move the magnet 42 along its path to close the reed switch 45 and thus complete a circuit to the unit 21. At the same time, any light pulse detected from the light source will pass through the axial bore 46 of tip 33 from the front open end 47 to the rear open end 48 to confront the polished end face 25 of the light pipe and be transmitted thereby to the unit 21.

The switch means 49 formed by the plunger, tip magnet and reed switch is an SPST switch which is normally open with a current capacity of about 0.25 amperes. The light pipe 22 is formed of a multiplicity of .003 diameter glass fibers encased in a PVC tube, there being a pair of Teflon insulated wires also enclosed therein to connect the reed switch 45 to unit 21.

I claim:

1. In combination with an electronic unit, sensitive to light pulses;

a flexible, fiber optic, light pipe having one end connected to said electronic unit for transmitting light pulses thereto and having a free terminal end with a transverse face adapted to receive light;

a light pen mounted on the said free terminal end of said light pipe, said pen including a spring biased, tubular plunger, having an axial bore open at each opposite end and adapted to transmit light from an exterior light source, through said bore, to said end face and switch means, associated with said light pen, and operably connected to said plunger for activating said system when said plunger is pressed against a light source.

2. A combination as specified in claim 1 wherein:

said plunger includes an integral annular shoulder projecting outwardly therefrom, said pen includes a removable sleeve encircling said plunger and said pen includes a coil spring encircling said plunger between said shoulder and sleeve for spring biasing said tubular plunger.

3. A combination as specified in claim 1 wherein:

said pen includes a removable, tubular sleeve slidably receiving said tubular plunger, said sleeve having an elongated groove containing an axially extending reed switch and said plunger having an elongated groove containing an axially extending permanent magnet, said reed switch and magnet constituting said switch means.

4. A combination as specified in claim 1 wherein:

said light pen includes a hollow, tubular, two part, telescopable body comprising a tubular nose-piece and a tubular tail-piece, said nose-piece having a forward bore for receiving said plunger, an intermediate larger bore and a rearward, still larger bore and includes a removable tubular sleeve in said rearward bore slidably receiving said plunger, said sleeve containing a reed switch and said plunger carrying a magnet for actuating said reed switch.

5. A plunger operated magnetic reed switch comprising:

a hollow tubular body formed of a hollow tubular nose-piece telescopably mounted on a hollow tubular tail-piece, a hollow, tubular plunger having a hollow, tubular tip projecting outwardly from said nose-piece but axially movable inwardly thereof against spring pressure, a flexible, fiber optic, light pipe projecting outwardly from said tail-piece but extending inwardly and axially of said tail-piece to a polished end confronting the adjacent inner end of said hollow tip to receive light therefrom, and switch means in said body, for closing a circuit when said plunger tip is moved inwardly toward the polished end of said light pipe.

6. A combination as specified in claim 5 wherein:

said switch means includes a permanent magnet affixed to the exterior of said hollow tubular plunger within said nose-piece and a reed switch mounted in said body, alongside and outside, the path of travel of said magnet, for actuating said reed switch when said plunger is compressed.

* * * * *